US012340963B2

(12) United States Patent
Zhang et al.

(10) Patent No.: US 12,340,963 B2
(45) Date of Patent: Jun. 24, 2025

(54) TRIP AND RESET MECHANISM FOR LEAKAGE CURRENT DETECTION AND INTERRUPTION DEVICE

(71) Applicant: Chengli Li, Suzhou (CN)

(72) Inventors: Xiaoming Zhang, Suzhou (CN); Chengli Li, Suzhou (CN)

(73) Assignee: Chengli Li, Suzhou (CN)

( * ) Notice: Subject to any disclaimer, the term of this patent is extended or adjusted under 35 U.S.C. 154(b) by 519 days.

(21) Appl. No.: 18/045,552

(22) Filed: Oct. 11, 2022

(65) Prior Publication Data

US 2024/0112872 A1 Apr. 4, 2024

(30) Foreign Application Priority Data

Sep. 29, 2022 (CN) ......................... 202211203085.4
Sep. 29, 2022 (CN) ......................... 202222589322.7

(51) Int. Cl.
*H01H 51/01* (2006.01)
*H01H 50/02* (2006.01)
*H01H 50/18* (2006.01)
*H01H 50/44* (2006.01)
*H01H 51/06* (2006.01)

(52) U.S. Cl.
CPC ............ *H01H 50/18* (2013.01); *H01H 50/02* (2013.01); *H01H 50/44* (2013.01); *H01H 51/01* (2013.01); *H01H 51/06* (2013.01)

(58) Field of Classification Search
CPC ......... H01H 51/01; H01H 51/06; H01H 77/08
USPC .......................................... 335/18, 174, 229
See application file for complete search history.

(56) References Cited

U.S. PATENT DOCUMENTS 4,462,013 A * 7/1984 Ueda ..................... H01F 7/1615 335/229
4,931,758 A * 6/1990 Bagalini .............. H01H 71/322 335/184
6,975,191 B2 * 12/2005 Ward ..................... H01H 51/01 335/229
8,248,192 B2 * 8/2012 Hu ....................... H01H 71/322 361/49

* cited by examiner

*Primary Examiner* — Alexander Talpalatski
(74) *Attorney, Agent, or Firm* — Chen Yoshimura LLP

(57) ABSTRACT

A core unit for a leakage current detection and interruption device includes a control circuit board; a drive coil assembly coupled to the circuit board, including a coil holder frame and an input or output assembly connected thereto; and a magnetic movement assembly nested with the drive coil assembly, including a magnetic movement frame and the output or input assembly connected thereto. In response to relative movements between the drive coil assembly and the magnetic movement assembly away from or toward each other, the input and output assemblies are disconnected from or connected to each other, respectively. The core unit achieves reset function and trip function by the coordination of the drive coil assembly and magnetic movement assembly, effectively ensuring power connection and disconnection while reducing the number of components. This design reduces the size of the device and reduces assembly cost.

12 Claims, 7 Drawing Sheets

TRIP AND RESET MECHANISM FOR LEAKAGE CURRENT DETECTION AND INTERRUPTION DEVICE

BACKGROUND OF THE INVENTION

Field of the Invention

This invention relates to electrical appliances, and in particular, it relates to a trip and reset mechanism (core unit) used in a leakage current detection and interruption device.

Description of Related Art

To ensure safety of electrical appliances, leakage current detection and interruption devices are widely used in an increasing number of applications. In in conventional leakage current detection and interruption devices, the core unit—the movement mechanism of the device, which includes both trip functionality and reset functionality—tend to take up a large part of the internal space of the device, making it difficult to include additional functions in the device. It also causes the exterior appearance of the device to be less than ideal, affecting the aesthetics of the consumer product utilizing such a device. Moreover, because of the sizes of conventional leakage current detection and interruption devices, they cannot be used in certain conditions, such as certain standard water-proof boxes for power receptacles in some bathrooms, causing inconvenience for users. The large size also makes these devices inconvenient to carry. Further, the relatively complex structures and large sizes of conventional leakage current detection and interruption devices increases manufacturing complexity and cost. Therefore, there is a need for core unit for leakage current detection and interruption device the have smaller sizes.

SUMMARY

To solve the above problems, embodiments of the present invention provide a core unit for leakage current detection and interruption devices, in which the reset mechanism and/or trip mechanism are achieved using fewer components and a more compact structure, thereby reducing the size of the leakage current detection and interruption device and making the device more versatile.

In one aspect, the present invention provides a core unit for a leakage current detection and interruption device, which includes: a control circuit board; a drive coil assembly, coupled to the circuit board, including at least a coil holder frame and a first one of an input assembly and an output assembly connected to the coil holder frame; and a magnetic movement assembly, nested with the drive coil assembly, including at least a magnetic movement frame and a second one of the input assembly and the output assembly connected to the magnetic movement frame; wherein in response to relative movements between the drive coil assembly and the magnetic movement assembly away from each other or toward each other, the input assembly and the output assembly are disconnected from each other or connected to each other, respectively.

Embodiments of the invention may include one or more of the following options.

In some embodiments, the core unit further includes a trip spring disposed between the drive coil assembly and the magnetic movement assembly, configured to keep the input and output assemblies disconnected from each other.

In some embodiments, the drive coil assembly further includes a solenoid disposed on the coil holder frame, and an iron core and a core spring disposed inside the solenoid, wherein the core spring is nested around the iron core, wherein back and forth movements of the iron core within the solenoid is configured to drive the input and output assemblies to be connected to each other.

In some embodiments, the solenoid includes a radially inwardly protruding step feature located inside the solenoid at an end closer to the magnetic movement assembly, configured to support the core spring, and wherein the iron core includes a cap located at an end farther away from the magnetic movement assembly, and wherein the core spring is restrained between the step feature and the cap.

In some embodiments, the solenoid is configured to generate a magnetic field having a predetermined direction and a predetermined magnitude when it is energized, and wherein the magnetic field of the solenoid induces a magnetic field in the iron core having a direction identical to that of the magnetic field of the solenoid and another predetermined magnitude.

In some embodiments, the coil holder frame defines a plunger cavity at an end closer to the magnetic movement assembly, configured to accommodate a portion of the magnetic movement assembly, and wherein the drive coil assembly further includes two first arm rests disposed on two sides outside of the plunger cavity configured to mount the first one of the input and output assemblies.

In some embodiments, the magnetic movement frame of the magnetic movement assembly includes a plunger, at least partially nested inside the plunger cavity, and configured to move back and forth within the plunger cavity, wherein the plunger includes a permanent magnet.

In some embodiments, a magnetic attraction force exerted by the permanent magnet on the iron core when the solenoid is not energized is greater than a sum of spring forces of the core spring and the trip spring.

In some embodiments, a magnetic pole of the permanent magnet on a side facing the iron core is the same as a magnetic pole of the iron core on a side facing the permanent magnet when the solenoid is energized.

In some embodiments, the plunger includes one or more resilient hooks on its outer wall, and a wall of the plunger cavity includes corresponding slide slots configured to accommodate the hooks in a sliding engagement, wherein when the hooks moves to near a far end of the slide slots in response to a spring force of the trip spring, the input and output assemblies are disconnected.

In some embodiments, the magnetic movement frame further includes two second arm rests located on two sides of an outer wall of the plunger, configured to mount the second one of the input and output assemblies.

In some embodiments, the plunger cavity defines position limiting slots on its wall located respectively corresponding to the second arm rests, configured to accommodate parts of the second arm rests to prevent the plunger from rotating within the plunger cavity when moving back and forth.

In some embodiments, the core unit further includes a reset button disposed near the drive coil assembly, configured to cause the drive coil assembly to move toward the magnetic movement assembly when the reset button is depressed.

The core unit according to embodiments of the present invention achieves reset function and trip function by the coordination of the drive coil assembly and magnetic movement assembly, effectively ensuring power connection and disconnection while reducing the number of components.

This design reduces the size of the device and reduces assembly cost. It has a simple structure, is easy to implement, is suitable for mass production, and can be made modular for use in different kinds of leakage current detection and interruption devices.

BRIEF DESCRIPTION OF THE DRAWINGS

Preferred embodiments of the present invention are described with reference to the drawings.

DETAILED DESCRIPTION OF PREFERRED EMBODIMENTS

Preferred embodiments of the present and their applications are described below. It should be understood that these descriptions describe embodiments of the present invention but do not limit the scope of the invention. When describing the various components, directional terms such as "up," "down," "top," "bottom" etc. are not absolute but are relative. These terms may correspond to the views in the various illustrations, and can change when the views or the relative positions of the components change.

In this disclosure, terms such as "couple", "attach"m "connect", etc. should be understood broadly; for example, they may be fixed connections, or removable or detachable connections, or integrally connected for integrally formed; they may be directly connected, or indirectly connected via intermediate parts. Those skilled in the relevant art can readily understand the meaning of these terms as used in this disclosure based on the specific description and context.

In this disclosure, unless specifically indicated, terms such as "first", "second", etc. do not connote a temporal or spatial sequence or a particular number of parts.

A leakage current detection and interruption device typically includes a shell and a core unit disposed inside the shell. The core unit is a key part of the device, and includes most of the components involved in providing the protection function, including without limitation, reset function, trip function, etc. With the rapid developments in automation industries and increased diversity of application scenarios, there is a need for the core units to be modularized and made more complex, in order to significantly reduce the number of parts, lower manufacturing and assembly cost, and improve versatility of applications.

To achieve these goals, embodiments of the present invention provide a core unit for leakage current detection and interruption device that has a relatively small size. The leakage current detection and interruption devices that may employ such core units include, without limitation, power plugs, power receptacles, etc.

Figure 1:
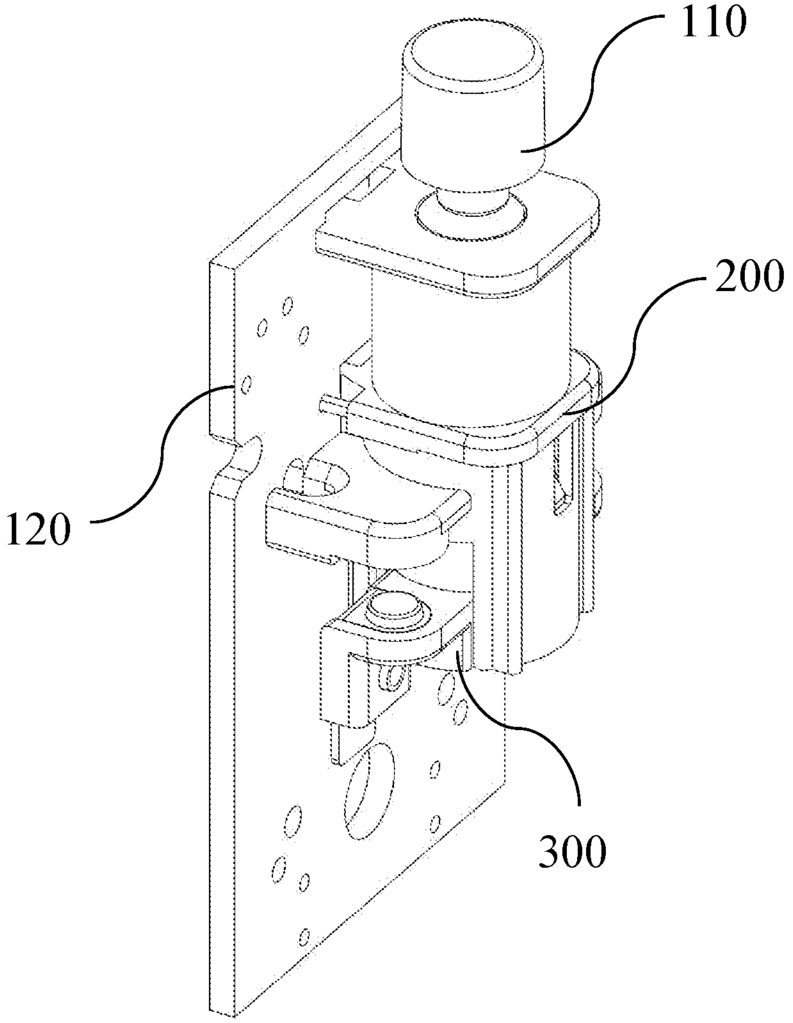
FIG. 1 illustrates an overall exterior view of a core unit of a leakage current detection and interruption device according to an embodiment of the present invention.
Figure 2:
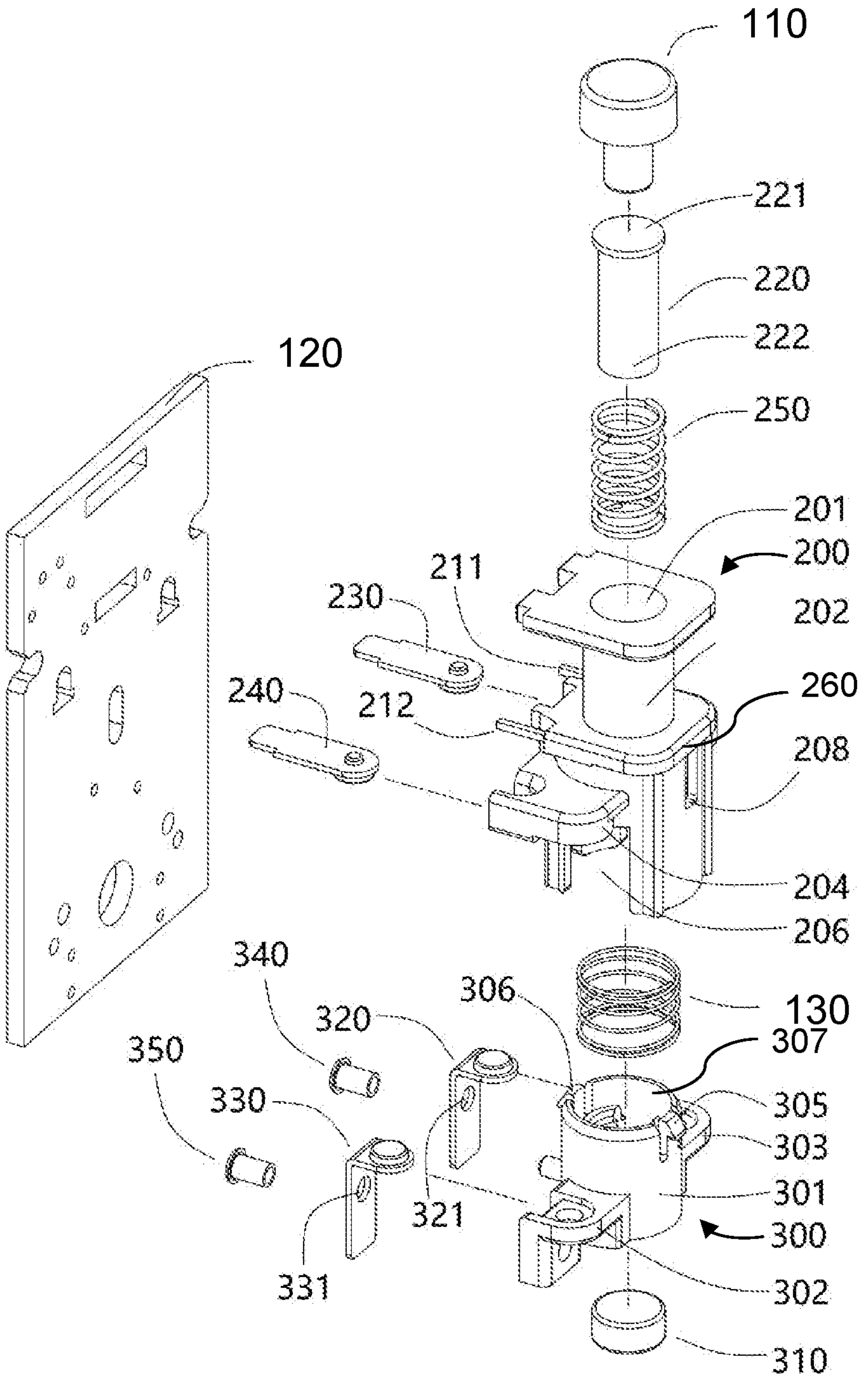
FIG. 2 is an exploded view of the core unit of FIG. 1
Figure 3:
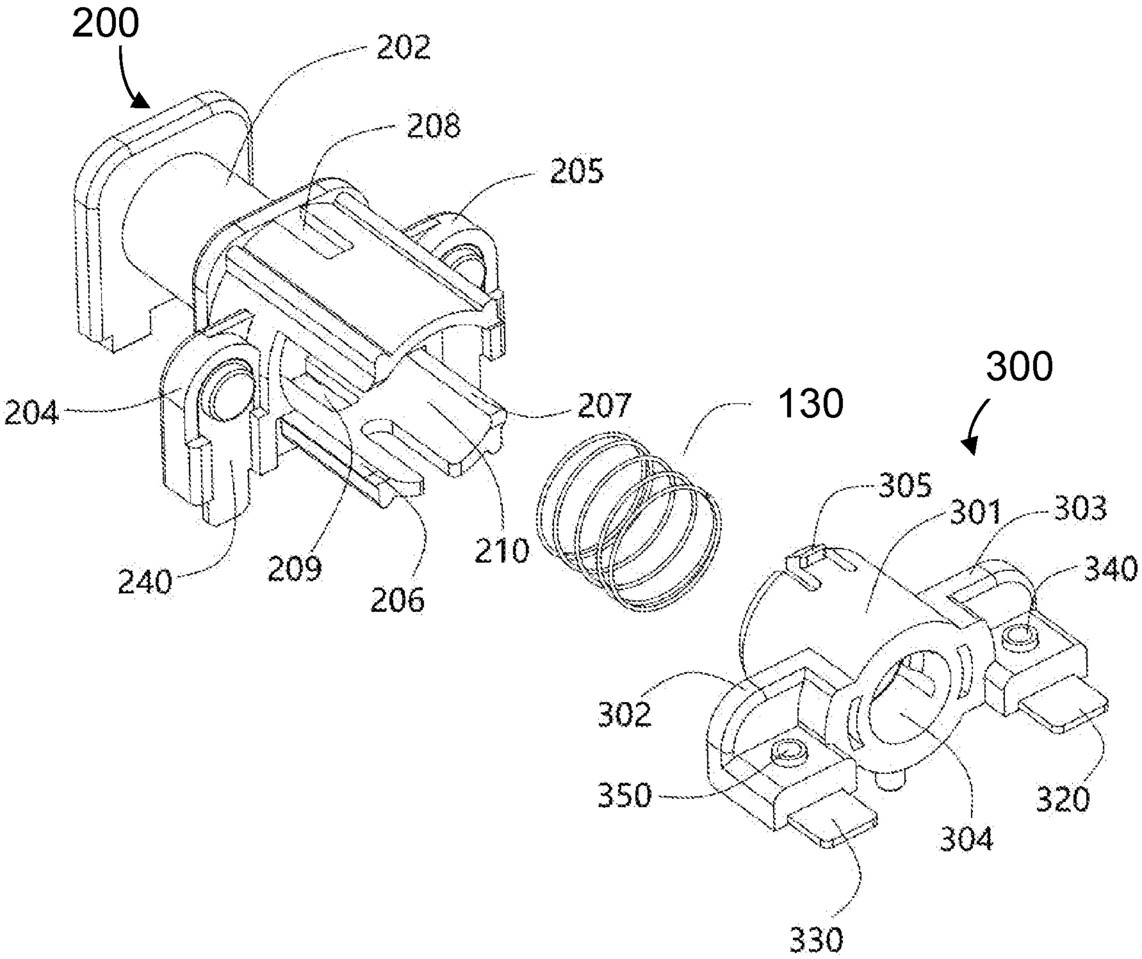
FIG. 3 illustrates the drive coil assembly, trip spring, and magnetic movement assembly of the core unit of FIG. 2.

Refer to FIGS. 1-3, which illustrates a core unit according to an embodiment of the present invention. The core unit includes a control circuit board (e.g. printed circuit board, PCB) 120, drive coil assembly 200, and magnetic movement assembly 300, and optionally a reset button 110. These various parts are assembled in a compact manner into a unit, and the unit can be conveniently placed into the shell. This is advantageous for automated mass production. The core unit may be assembled with different shaped shells or assembled with other components, in order to adapt to different types of leakage current detection and interruption devices used in different application scenarios.

Referring to FIGS. 2 and 3, the drive coil assembly 200 is coupled to the circuit board 120, and includes at least a coil holder frame 260 and an input assembly or an output assembly connected thereto. In the illustrated embodiment, an output assembly is connected to the coil holder frame 260. The magnetic movement assembly 300 is nested with the drive coil assembly 200, and includes at least a magnetic movement frame 301 and an output assembly or an input assembly connected thereto. In the illustrated embodiment, an input assembly is connected to the magnetic movement frame 301.

According to embodiments of the present invention, in the core unit, in response to the relative movement between the drive coil assembly 200 and the magnetic movement assembly 300 away from each other or toward each other, the input assembly and the output assembly are disconnected from or connected to each other, respectively. In other words, when the drive coil assembly 200 and the magnetic movement assembly 300 move toward each other under the drive force of a particular direction and magnitude, so they are relatively close to each other, the input assembly and output assembly are brought to move toward each other to be in a closed (contact) position, achieving the electrical connection between the input and output end of the device. On the other hand, when the drive coil assembly 200 and the magnetic movement assembly 300 move away from each other, so they are relatively far away from each other, the input assembly and output assembly are brought to move away from each other to be in an open (non-contact) position, achieving the electrical disconnection between the input and output end of the device.

Figure 5:
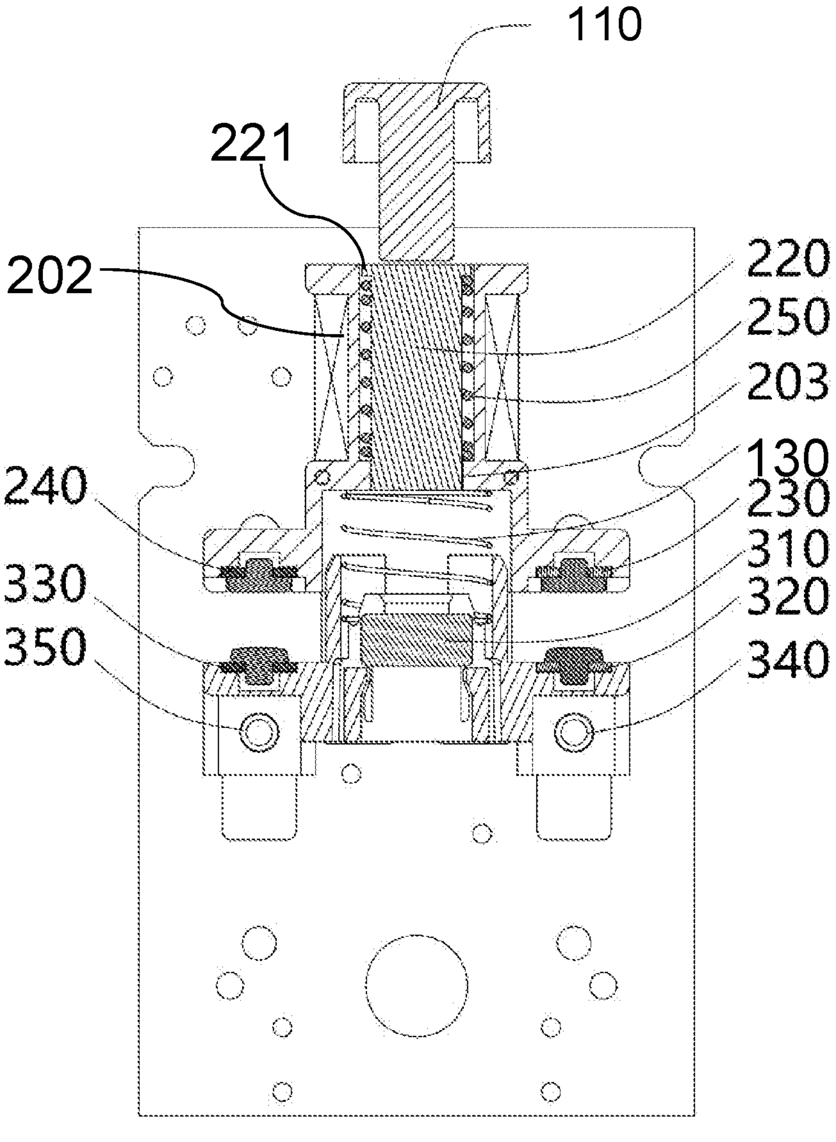
FIG. 5 is a cross-sectional view of the core unit in the disconnected state of FIG. 4.

In some embodiments, the drive coil assembly 200 includes a solenoid (coil) 202 disposed on the coil holder frame 260. More specifically, a bobbin 201 is disposed at one end of the coil holder frame 260, and wires are wound around the bobbin 201 to form the coil 202 with two wire terminals 211, 212. An iron core 220 and a core spring 250 are disposed inside the solenoid 202, with the core spring 250 nested around the iron core 220. The back and forth movement of the iron core 220 within the solenoid 202 drives the input and output assemblies to be in the connected state. In some embodiment, as shown in FIG. 5, on the inside of the bobbin 201 of the solenoid, at the end closer to the magnetic movement assembly 300, a radially inwardly protruding step feature 203 is formed to support the core spring 250. Correspondingly, the iron core 220 has a cap 221 at its end farther away from the magnetic movement assembly 300, so that the core spring 250 is restrained between the step feature 203 and the cap 221. Thus, when the user depresses the reset button 110, which is located above and against the iron core 220, the iron core 220 moves along the solenoid 202 to a position where the core spring 250 is compressed and exerts an upward force on the iron core 220.

In some embodiments, the coil holder frame 260 has a plunger cavity 210 at its end closer to the magnetic movement assembly 300, configured to accommodate a portion of the magnetic movement assembly 300, as shown in FIG. 3.

Two first arm rests 204, 205 are respectively provided on two sides outside of the plunger cavity 210 for mounting the output assembly. In the illustrated embodiment, the output assembly includes a hot output terminal 240 and a neutral output terminal 230. In the example shown in FIG. 3, the arm rests 204, 205 have slots to respectively accommodate and affix the hot and neutral output terminals 240 and 230. Optionally, the two terminals of the output assembly are coupled to the circuit board 120. Each input terminal has a contact point (e.g. a rivet) configured to make electrical contact with the corresponding terminals of the input assembly.

For the magnetic movement assembly 300, the magnetic movement frame 301 includes a plunger 307, which is located in the middle of the magnetic movement frame 301, at least partially nested inside the plunger cavity 210, and moveable back and forth within the plunger cavity 210. The plunger 307 includes a hollow space 304 and a permanent magnet 310 disposed inside the space. As shown in FIG. 5, in some embodiments, the permanent magnet 310 may be affixed to the plunger (magnetic movement frame 301) by a suitable structure such as snaps.

In some embodiments, when the wire terminals 211, 212 of the solenoid 202 are connected to a working power supply, the solenoid 202 is energized and generates a magnetic field of predetermined direction and magnitude, which induces a magnetic field in the iron core 220 of the same direction and predetermined magnitude. The iron core 220 and the permanent magnet 310 interact with each other to disconnect the input and output assemblies from each other. Beneficially, the polarity of the permanent magnet 310 is such that its magnetic pole on the side facing the iron core 220 is the same as the magnetic pole of the iron core 220 on the side 222 facing the permanent magnet 310 when the solenoid 202 is energized. In other words, when the solenoid 202 is energized, the iron core 220 and permanent magnet 310 repel each other.

In some embodiments, the plunger 307 have one or more resilient hooks on its outer wall, such as two resilient hooks 305, 306 located on opposite sides as shown in FIGS. 2 and 3. The wall of the plunger cavity 210 has corresponding slide slots 208, 209 configured to accommodate the two hooks 305, 306 in a sliding engagement, with the sliding range being limited by the hooks and the slot ends. The magnetic movement frame 301 further includes two second arm rests 302, 303 located on two sides of the outer wall of the plunger 307, configured to mount the input assembly. In the illustrated embodiment, the input assembly includes a neutral input terminal 320 and a hot input terminal 330. Each input terminal has a contact point (e.g. a rivet) configured to make electrical contact with the corresponding terminals of the output assembly. Optionally, the second arm rests 302, 303 respectively have mounting holes, and the neutral and hot input terminal 320, 330 respectively have through holes 321, 331 in their midsection; two mounting rivets 340, 350 respectively pass through the through holes 321, 331 and the corresponding mounting holes to securely mount the input assembly to the second arm rests 302, 303.

In some embodiments, the wall of the plunger cavity 210 has position limiting slots 206, 207 respectively corresponding to the second arm rests 302, 303, to accommodate parts of the second arm rests to prevent the plunger 307 from rotating within the plunger cavity 210 when moving back and forth.

To achieve the relative movements of the drive coil assembly 200 and the magnetic movement assembly 300, and to maintain the open (disconnected) or closed (connected) states of the input and output assemblies, the core unit further includes a trip spring 130 disposed between the drive coil assembly 200 and magnetic movement assembly 300. Thus, the action of depressing the reset button 110 causes the drive coil assembly 200 to move towards the magnetic movement assembly 300 to achieve the connected state; on the other hand, the magnetic force in the solenoid 202 and iron core 220 can urge the drive coil assembly 200 to move away from the magnetic movement assembly 300 to achieve the disconnected state. Further, in the transition from the connected state to the disconnected state, under the action of the (compressed) trip spring 130, the resilient hooks 305, 306 of the plunger 307 slide along the slide slots 208, 209 of the plunger cavity 210, until the hooks reach the end of the sliding slots 208, 209 where the input and output assemblies are in a relatively stable disconnected state.

Figure 4:
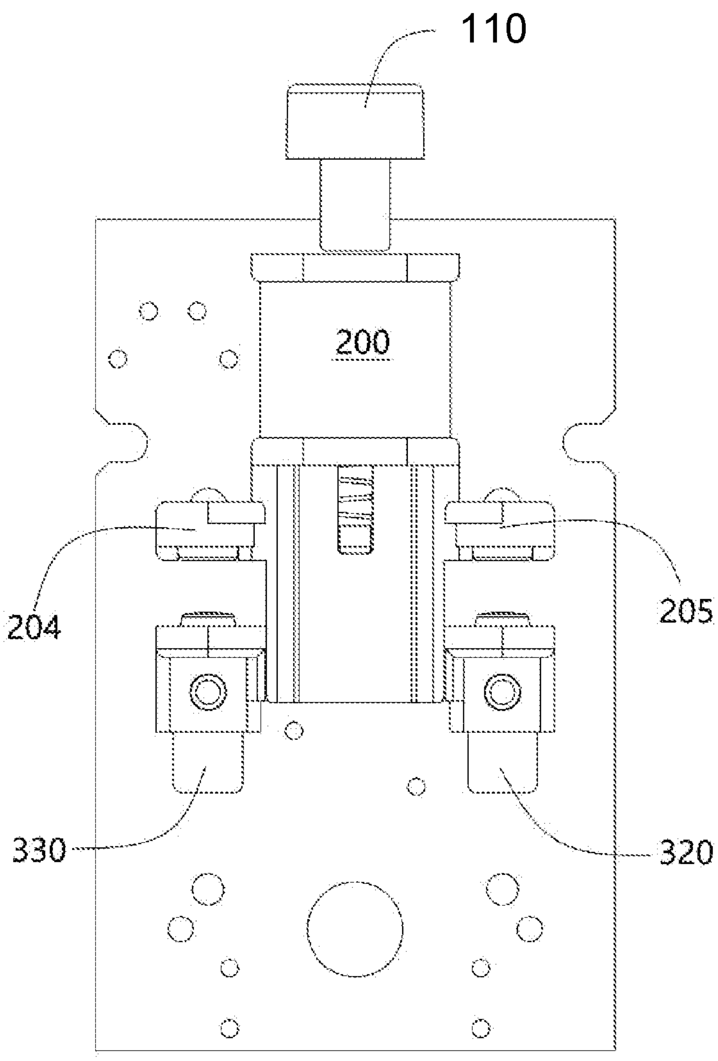
FIG. 4 is a plan view showing the core unit in a disconnected state.
Figure 6:
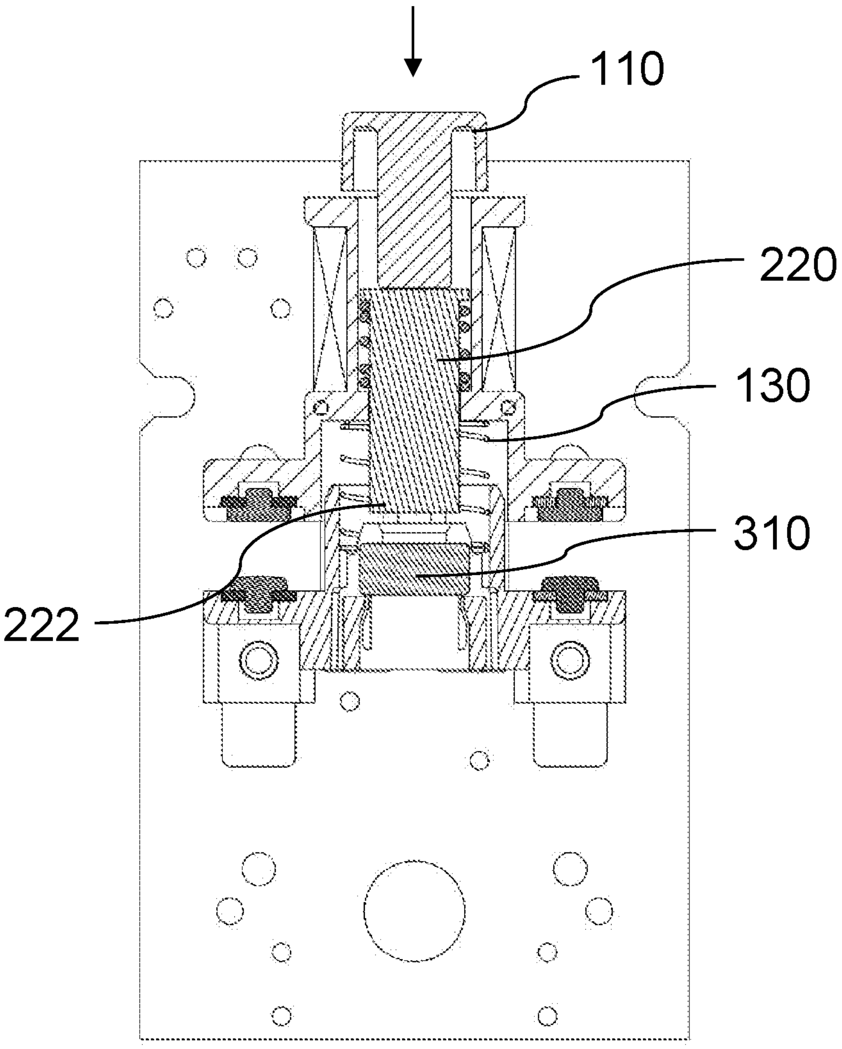
FIG. 6 is a cross-sectional view of the core unit in a reset (reset button depressed) state.

The working principles and operation of the core unit are described below with reference to FIGS. 4-7. FIGS. 4 and 5 illustrate the disconnected or tripped state; FIG. 6 illustrates the state when the reset button is depressed; and FIG. 7 illustrates the connected or reset state.

Referring to FIGS. 4 and 5, because the plunger 307 of the magnetic movement assembly 300 is nested in the plunger cavity 210 of the drive coil assembly 200, and the hooks 305, 306 are disposed in the respective slide slots 208, 209, under the action of the trip spring 130, the drive coil assembly 200 and magnetic movement assembly 300 are maintained relatively far away from each other. The hot and neutral output terminals 240, 230 and the respective hot and neutral input terminals 330 and 320 are in the disconnected state, and electrical connection between the input and output ends are disconnected.

Figure 7:
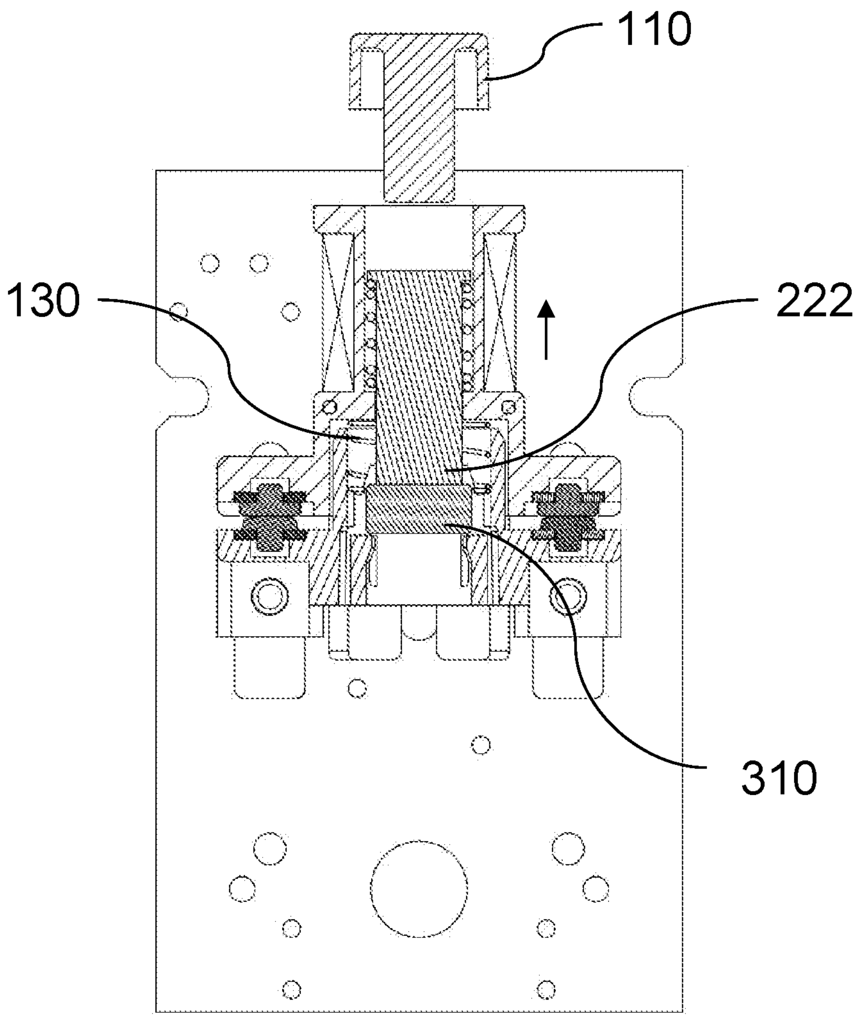
FIG. 7 is a cross-sectional view of the core unit in a connected state.

When the reset button 110 is depressed as indicated by the downward arrow in FIG. 6 (reset operation), the iron core 220 overcomes the force of the core spring 250 and moves toward the permanent magnet 310 of the magnetic movement assembly 300, so that the lower end 222 of the iron core and the permanent magnet 310 are attracted to each other due to the magnetic field of the permanent magnet and contact each other, as shown in FIG. 7. In this state, when the reset button 110 is released, the iron core 220 is urged by the core spring 250 in the upwards direction as indicated by the arrow in FIG. 7, and brings (by the magnetic force) the magnetic movement assembly 300 along with the hot and neutral input terminals 330, 320 towards the hot and neutral output terminal 240 and 230, until the input and output terminals contact each other and remain in contact. In this state, the hot and neutral output terminals 240, 230 and the hot and neutral input terminals 330, 320 are respectively in the closed state to electrically connect the input and output ends.

In the closed state, the magnetic force F1 generated by the permanent magnet 310 attracts the iron core 220 and permanent magnet 310 toward each other (when the solenoid is not energized); meanwhile, the core spring 250 exerts an upward force F2 on the iron core 220, and the trip spring 130 exerts a downward force F3 on the magnetic movement assembly 300, both of which urge the iron core 220 and the permanent magnet 310 to separate from each other. The components are designed such that the attraction force F1 is greater than the sum of separation forces F2 and F3. As a result, the iron core 220 and permanent magnet 310 remain in contact with each other. Moreover, the components are designed such that the upward force F2 exerted by the core spring 250 is greater than the downward force F3 exerted by the trip spring 130, so that the net force exerted by the two springs on the iron core 220 and permanent magnet 310 is upwards. As a result, the hot and neutral input terminals 330 and 320 remain in stable contact with the hot and neutral output terminals 240 and 230.

In the close state, once a predetermined current is made to flow through the solenoid 202 via wire terminals 211, 212, the solenoid 202 generates the magnetic field of predetermined direction and magnitude at the lower end 222 of the iron core. As described earlier, the polarity of this magnetic field is such that the lower end 222 of the iron core repels the permanent magnet 310. As a result, the permanent magnet 310 brings the magnetic movement assembly 300 downwards so that the hot and neutral input terminals 330 and 320 move away from the hot and neutral output terminals 240, 230. The trip spring 130 exerts a downward force on the magnetic movement assembly 300 to keep the hot and neutral input terminals 330 and 320 in the disconnected state shown in FIGS. 4 and 5.

The core unit according to embodiments of the present invention uses a relatively small number of components and a compact layout and can effectively achieve reset and trip functions for leakage current protection. It is easy to operate, and allows for the overall size of the unit to be reduced. Further, it may be made into a modular device suitable for various types of leakage current detection and interruption devices.

It should be understood that the embodiments shown in the drawings only illustrate the preferred shapes, sizes and spatial arrangements of the various components of the core unit of a leakage current detection and interruption device. These illustrations do not limit the scope of the invention; other shapes, sizes and spatial arrangements may be used without departing from the spirit of the invention.

It will be apparent to those skilled in the art that various modification and variations can be made in the embodiments of the present invention without departing from the spirit or scope of the invention. Thus, it is intended that the present invention cover modifications and variations that come within the scope of the appended claims and their equivalents.

What is claimed is:

1. A core unit for a leakage current detection and interruption device, comprising:

a control circuit board;

a drive coil assembly, coupled to the circuit board, including at least a coil holder frame and a first one of an input assembly and an output assembly connected to the coil holder frame;

a magnetic movement assembly, nested with the drive coil assembly, including at least a magnetic movement frame and a second one of the input assembly and the output assembly connected to the magnetic movement frame;

wherein in response to relative movements between the drive coil assembly and the magnetic movement assembly away from each other or toward each other, the input assembly and the output assembly are disconnected from each other or connected to each other, respectively; and a trip spring disposed between the drive coil assembly and the magnetic movement assembly, configured to keep the input and output assemblies disconnected from each other;

wherein the drive coil assembly further includes a solenoid disposed on the coil holder frame, and an iron core and a core spring disposed inside the solenoid, wherein the core spring is nested around the iron core, wherein back and forth movements of the iron core within the solenoid are configured to drive the input and output assemblies to be connected to each other; and wherein the solenoid includes a radially inwardly protruding step feature located inside the solenoid at an end closer to the magnetic movement assembly, configured to support the core spring, and wherein the iron core includes a cap located at an end farther away from the magnetic movement assembly, and wherein the core spring is restrained between the step feature and the cap.

2. The core unit of claim 1, wherein the solenoid is configured to generate a magnetic field having a predetermined direction and a predetermined magnitude when it is energized, and wherein the magnetic field of the solenoid induces a magnetic field in the iron core having a direction identical to that of the magnetic field of the solenoid and another predetermined magnitude.

3. The core unit of claim 2, wherein the coil holder frame defines a plunger cavity at an end closer to the magnetic movement assembly, configured to accommodate a portion of the magnetic movement assembly, and wherein the drive coil assembly further includes two first arm rests disposed on two sides outside of the plunger cavity configured to mount the first one of the input and output assemblies.

4. The core unit of claim 3, wherein the magnetic movement frame of the magnetic movement assembly includes a plunger, at least partially nested inside the plunger cavity, and configured to move back and forth within the plunger cavity, wherein the plunger includes a permanent magnet.

5. The core unit of claim 4, wherein a magnetic attraction force exerted by the permanent magnet on the iron core when the solenoid is not energized is greater than a sum of spring forces of the core spring and the trip spring.

6. The core unit of claim 4, wherein a magnetic pole of the permanent magnet on a side facing the iron core is the same as a magnetic pole of the iron core on a side facing the permanent magnet when the solenoid is energized.

7. A core unit for a leakage current detection and interruption device, comprising:

a control circuit board;

a drive coil assembly, coupled to the circuit board, including at least a coil holder frame and a first one of an input assembly and an output assembly connected to the coil holder frame;

a magnetic movement assembly, nested with the drive coil assembly, including at least a magnetic movement frame and a second one of the input assembly and the output assembly connected to the magnetic movement frame;

wherein in response to relative movements between the drive coil assembly and the magnetic movement assembly away from each other or toward each other, the input assembly and the output assembly are disconnected from each other or connected to each other, respectively;

a trip spring disposed between the drive coil assembly and the magnetic movement assembly, configured to keep the input and output assemblies disconnected from each other;

wherein the drive coil assembly further includes a solenoid disposed on the coil holder frame, and an iron core and a core spring disposed inside the solenoid, wherein the core spring is nested around the iron core, wherein back and forth movements of the iron core within the solenoid are configured to drive the input and output assemblies to be connected to each other;

wherein the solenoid is configured to generate a magnetic field having a predetermined direction and a predetermined magnitude when it is energized, and wherein the magnetic field of the solenoid induces a magnetic field in the iron core having a direction identical to that of the magnetic field of the solenoid and another predetermined magnitude;

wherein the coil holder frame defines a plunger cavity at an end closer to the magnetic movement assembly, configured to accommodate a portion of the magnetic movement assembly, and wherein the drive coil assembly further includes two first arm rests disposed on two sides outside of the plunger cavity configured to mount the first one of the input and output assemblies;

wherein the magnetic movement frame of the magnetic movement assembly includes a plunger, at least partially nested inside the plunger cavity, and configured to move back and forth within the plunger cavity, wherein the plunger includes a permanent magnet; and wherein the plunger includes one or more resilient hooks on its outer wall, and a wall of the plunger cavity includes corresponding slide slots configured to accommodate the hooks in a sliding engagement, wherein when the hooks move to near a far end of the slide slots in response to a spring force of the trip spring, the input and output assemblies are disconnected.

8. The core unit of claim 4, wherein the magnetic movement frame further includes two second arm rests located on two sides of an outer wall of the plunger, configured to mount the second one of the input and output assemblies.

9. A core unit for a leakage current detection and interruption device, comprising:

a control circuit board;

a drive coil assembly, coupled to the circuit board, including at least a coil holder frame and a first one of an input assembly and an output assembly connected to the coil holder frame;

a magnetic movement assembly, nested with the drive coil assembly, including at least a magnetic movement frame and a second one of the input assembly and the output assembly connected to the magnetic movement frame;

wherein in response to relative movements between the drive coil assembly and the magnetic movement assembly away from each other or toward each other, the input assembly and the output assembly are disconnected from each other or connected to each other, respectively;

a trip spring disposed between the drive coil assembly and the magnetic movement assembly, configured to keep the input and output assemblies disconnected from each other;

wherein the drive coil assembly further includes a solenoid disposed on the coil holder frame, and an iron core and a core spring disposed inside the solenoid, wherein the core spring is nested around the iron core, wherein back and forth movements of the iron core within the solenoid is configured to drive the input and output assemblies to be connected to each other;

wherein the solenoid is configured to generate a magnetic field having a predetermined direction and a predetermined magnitude when it is energized, and wherein the magnetic field of the solenoid induces a magnetic field in the iron core having a direction identical to that of the magnetic field of the solenoid and another predetermined magnitude;

wherein the coil holder frame defines a plunger cavity at an end closer to the magnetic movement assembly, configured to accommodate a portion of the magnetic movement assembly, and wherein the drive coil assembly further includes two first arm rests disposed on two sides outside of the plunger cavity configured to mount the first one of the input and output assemblies;

wherein the magnetic movement frame of the magnetic movement assembly includes a plunger, at least partially nested inside the plunger cavity, and configured to move back and forth within the plunger cavity, wherein the plunger includes a permanent magnet;

wherein the magnetic movement frame further includes two second arm rests located on two sides of an outer wall of the plunger, configured to mount the second one of the input and output assemblies; and wherein the plunger cavity defines position limiting slots on its wall located respectively corresponding to the second arm rests, configured to accommodate parts of the second arm rests to prevent the plunger from rotating within the plunger cavity when moving back and forth.

10. The core unit of claim 1, further comprising a reset button disposed near the drive coil assembly, configured to cause the drive coil assembly to move toward the magnetic movement assembly when the reset button is depressed.

11. The core unit of claim 7, further comprising a reset button disposed near the drive coil assembly, configured to cause the drive coil assembly to move toward the magnetic movement assembly when the reset button is depressed.

12. The core unit of claim 9, further comprising a reset button disposed near the drive coil assembly, configured to cause the drive coil assembly to move toward the magnetic movement assembly when the reset button is depressed.

* * * * *